US008910201B1

(12) United States Patent
Zamiska et al.

(10) Patent No.: US 8,910,201 B1
(45) Date of Patent: Dec. 9, 2014

(54) PRODUCT PLACEMENT IN DIGITAL CONTENT

(71) Applicant: Amazon Technologies, Inc., Reno, NV (US)

(72) Inventors: James C. Zamiska, Palo Alto, CA (US); Dennis James Taylor, San Luis Obispo, CA (US); Joshua Daniel Wright, Pismo Beach, CA (US); Tommy Lee Bennett, San Luis Obispo, CA (US); Daniel Peter Cox, Sunnyvale, CA (US); Joven Michael Matias, Cupertino, CA (US); Jed Baraban Reinitz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/793,696

(22) Filed: Mar. 11, 2013

(51) Int. Cl.
| *H04N 7/10* | (2006.01) |
| *H04N 21/234* | (2011.01) |
| *H04N 21/442* | (2011.01) |
| *H04N 21/258* | (2011.01) |
| *H04N 21/81* | (2011.01) |
| *H04N 21/458* | (2011.01) |
| *H04H 60/33* | (2008.01) |
| *H04N 5/445* | (2011.01) |

(52) U.S. Cl.
CPC ... *H04N 21/23424* (2013.01); *H04N 21/44222* (2013.01); *H04N 21/25891* (2013.01); *H04N 21/23418* (2013.01); *H04N 21/812* (2013.01); *H04N 21/458* (2013.01)
USPC .................................... 725/34; 725/9; 725/60

(58) Field of Classification Search
None
See application file for complete search history.

(56) References Cited

U.S. PATENT DOCUMENTS

| 8,413,182 B2* | 4/2013 | Bill ................................. 725/34 |
| 2007/0226761 A1* | 9/2007 | Zalewski et al. ................. 725/32 |
| 2009/0276805 A1* | 11/2009 | Andrews, II et al. ............ 725/35 |
| 2010/0122285 A1* | 5/2010 | Begeja et al. .................... 725/34 |
| 2010/0122286 A1* | 5/2010 | Begeja et al. .................... 725/34 |
| 2012/0192221 A1* | 7/2012 | McDonough et al. ........... 725/31 |

* cited by examiner

*Primary Examiner* — Chris Parry
(74) *Attorney, Agent, or Firm* — Lee & Hayes, PLLC

(57) ABSTRACT

The techniques and systems described herein place product information at a location in digital content where an existing object occurs. The techniques may select the product information based on profile data indicative of interests of a user viewing the digital content. Accordingly, the techniques may identify existing objects in the digital content before the user begins viewing the digital content. The techniques may also receive or access product information to be placed in the digital content. The product information may include identifiable brands, products, or services. Then, while rendering the digital content before the user begins viewing the digital content or while the user is viewing the digital content, the techniques may select product information to dynamically place into a scene of the digital content at a location where the existing objects occur.

25 Claims, 6 Drawing Sheets

PRODUCT PLACEMENT IN DIGITAL CONTENT

BACKGROUND

Digital content such as movies and television programs often intentionally or unintentionally include brand name products and brand name services that are apparent to a viewer of the digital content. For example, when filming a movie or a television program, a character or actor in a particular scene may be drinking a particular kind of soda and/or wearing a shirt associated with a particular apparel company.

The creators and producers of the digital content are able to market a particular product or service and/or place an advertisement for the product or service in the digital content by selecting and placing the product, service, or advertisement in the scene. Once placed in the digital content, all the viewers of the digital content see the same products, services, and/or advertisements. Thus, the products, services, and advertisements that appear in the digital content are often chosen knowing that they will be seen by a broad audience of viewers that consume the digital content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
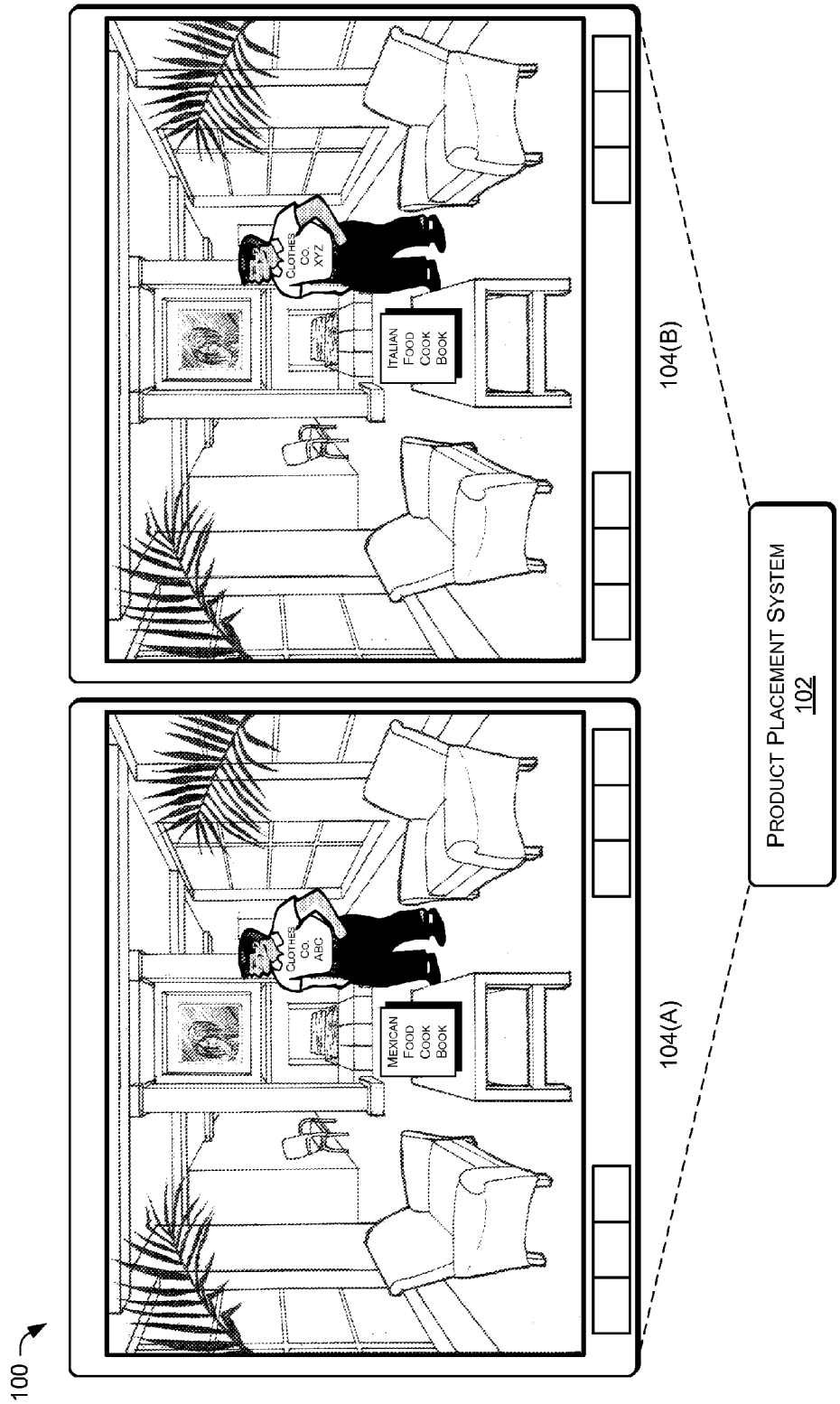
FIG. 1 shows an example overview that places product information into a scene of digital content.

The techniques and systems described herein place product information (e.g., an object, an image, graphical elements, a rendering, etc. featuring a particular brand name, product or service) at a location in digital content where an existing object occurs. The techniques may select the product information based on profile data indicative of interests of a user viewing the digital content. Accordingly, the techniques may identify existing objects in the digital content before the user begins viewing the digital content. The techniques may also receive or access product information to be placed in the digital content. The product information may include identifiable brands, products, or services. Then, while rendering the digital content before the user begins viewing the digital content or while the user is viewing the digital content, the techniques may select product information to dynamically place into a scene of the digital content at a location where the existing objects occur.

Since the selection of the product information may be based on, and matched with, information indicative of interests of the user, the product information placed in the digital content is more likely to appeal to the individual user. In various embodiments, the techniques may embed the product information as a placement object or part of a placement object so that the placement objects are active and the user is able to select the placement object while viewing the digital content. The user may then initiate a purchase of a product or service represented by the selected placement object and/or save the selected object for retrieval at a later time.

Advertisements that are distributed to a broad audience have been shown to generate less revenue per viewer than advertisements that target specific interests of individual viewers. As digital technology continues to develop and the use of personal devices and network communications becomes more convenient, service providers and content providers have begun to track user interests or gather user information so that they can select and provide targeted advertisements that are more likely to appeal to the individual user. However, these advertisements are typically displayed to the user as unwanted additional content that supplements the requested digital content the user is viewing (e.g., advertisements that break up the requested digital content or precede the requested digital content in a viewing sequence, sidebar advertisements, overlay advertisements, etc.). Since the advertisements are not integrated into, or part of, the actual requested digital content the user wants to view, the user often perceives the advertisements as an annoyance and/or a distraction from the digital content. The user may also perceive the advertisement as a waste of time, and thus, the user may pursue options to skip an advertisement, e.g., click a "close" option for a video advertisement that precedes an Internet video, fast forward through recorded commercials while viewing recorded digital content, or change a channel during commercial segments of a television broadcast. As discussed herein, the term "advertisement" includes featured products, featured services, and/or other intentional use of products or services to expose those products and services to a viewing audience.

The techniques discussed herein allow content providers to effectively market brand names, products and/or services without providing annoying, distracting, and time wasting conventional advertisements or commercials. The term "techniques" used herein, for instance, may refer to system(s), method(s), computer-readable instructions, algorithms, components, modules, and/or models as permitted by the context above and throughout this document. Moreover, as discussed herein digital content may include with audio and/or visual content, such as images (e.g., static images, photographs) or videos that include multiple video frames or sequence of still images. Examples of videos may include, but are not limited to movies, television programs, video on demand (VOD) programs, recorded programs, real-time or live television broadcasts, music videos, Internet videos (e.g., online streaming), personal videos, games, telepresence data, augmented reality data, or any other type of videos from which existing objects can be generated and/or extracted.

An existing object is an object of interest that appears in the digital content and that may be associated with a product placement opportunity. Thus, an existing object may be a physical element included in a scene of a movie or program at the time of filming (e.g., an actual soda can or cookbook). Or an existing object may be a virtual element configured when creating the digital content (e.g., an image on a display screen of a television, text of a book displayed on a tablet a user is reading, etc.). In some instances, an existing object may be a combination of a physical element and a virtual element. The existing object may include metadata that describes frames in video content where the existing object occurs (e.g., each frame is associated with timing location within video content), a geometrical description of the object (e.g., two-dimensional or three-dimensional) including a size, a shape, and a location of the object within a frame or sequence of frames as the object moves through a scene, as well as relations to other existing objects in the scene. Moreover, the existing object may include other graphical characteristics such as lighting, texture, color and orientation within the scene of the digital content. Thus, the metadata may describe timing information indicating where the object appears in the digital content, as well as graphical information indicating the graphical presence of the object on a display screen (e.g., x-y or spatial coordinates on a screen). In some embodiments, the graphical information of the object may change over time (e.g., through a sequence of frames) as the object moves through a scene (e.g., a car may increase in size as it drives toward a camera).

The metadata describing the existing object may also include a product category for the existing object and/or a context of a scene in the video in which the existing object occurs or appears. A product category and a context of a scene may be considered when selecting product placement information. For example, if a soda can is an existing object that occurs in a scene of a video, the metadata may describe that the product category is a "soda can" category. Then, the soda can marketing "Soda Type A" included in the scene during filming, may be appropriately replaced with a soda can marketing "Soda Type B" from the same category when the video is rendered for a particular viewer. In another example, the context of a scene in the video may indicate that the existing object, such as a book, is part of a scene in a kitchen. Therefore, the product information placed on or over the existing object may be selected from a category of books that are commonly found in kitchens (e.g., cook books), compared to other types of books which may not be commonly found in kitchens (e.g., novels).

Accordingly, the metadata describing the existing object may be used to select product information to place in the video content, as well as to graphically position or place the product information into the scene. In some embodiments, the existing object may be a target object that is completely replaced by a placement object. For example, if a movie is filmed with an actor wearing a shirt that markets "Clothes Co. ABC" (i.e., the existing object), then the placement object may be a shirt that markets "Clothes Co. XYZ," and the placement object may completely replace the existing object (e.g., new brand name, new logo, different color shirt, different pattern, etc.). In alternative embodiments, the product information is placed on the exiting object. That is the product information is inserted by mapping select graphical elements to corresponding elements of the existing object in accordance with the description. For example, the shirt color may remain the same but the brand name marketed may change from "Clothes Co. ABC" to "Clothes Co. XYZ." Thus, using the metadata describing the existing object, the product information may be inserted so that it appears as if it were physically present in the scene of a video at the time of filming or production.

Therefore, the product information to be placed in an image or in video content may be a placement object that includes digital data or graphical elements that represent an image, icon, label, text or the like that may be used to advertise, market, or promote brand names (e.g., company name, trademark, product name, etc.), products, and/or services by inserting them into the digital content on, or in the space of, an existing object (e.g., completely replace the existing object or map graphical elements to a particular portion of the existing object). In various embodiments, the placement object may also be an audio clip that can be digitally mixed with an audio channel of the digital content. For example, background music in a coffee shop can be an existing object that may be replaced by various placement objects that target particular music interests of a viewer. In another example, a type of soda verbally requested by a character may be inserted as a placement object. Thus, one viewer may hear the character ask a checkout clerk "can I please have Soda Type A" while another viewer may hear "can I please have Soda Type B."

A selectable placement object is a product or service embedded in the digital content that may be identified and selected by the user while the user is viewing the digital content (e.g., pause the video to select the selectable placement object). For example, the selection may automatically initiate the purchase of the product or service or add the product or service to a wish list or shopping cart associated with a user account, or otherwise save the product or service for retrieval at a later point in time. In some embodiments, the placement object or selectable placement object inserted into the digital content may be a product or service currently for sale in an associated electronic marketplace.

Example Overview

FIG. 1 shows an example overview 100 of an environment in which the techniques described herein may be implemented. As mentioned above, before a user begins to view digital content or while the user is viewing digital content, a product placement system 102 may identify, select and place product information into the digital content. In some embodiments, the product information may be selected based on individual user profile information that indicates personal interests and preferences. In other embodiments, the product information may be selected based on characteristics of the existing object (e.g., a category or scene context).

Thus, FIG. 1 shows two viewing screens 104(A) and 104(B) of the same scene in the same video content (e.g., movie, television program, etc.). In this example, different users (e.g., from different households using different television sets) are viewing the two screens 104(A) and 104(B). With respect to the user viewing screen 104(A), the individual user profile information may indicate a personal interest or preference in "Clothes Co. ABC" and "Mexican Food." With respect to the user viewing screen 104(B), the individual user profile information may indicate a personal interest or preference in "Clothes Co. XYZ" and "Italian Food."

In various embodiments, the product placement system 102 may learn and/or determine personal interests and preferences for a user based on an online purchase history, an online shopping history, an online browsing history, a current purchase wish list, and/or other tracked account activity (e.g., type of music the user listens to, type of videos watched etc. For example, the user viewing screen 104(A) may commonly order clothes from "Clothes Co. ABC," and this user may have recently purchased Mexican foods and spices from a favorite retailer. In contrast, the user viewing screen 104(B) may commonly order clothes from "Clothes Co. XYZ," and this user may have recently purchased a pasta making machine online.

Accordingly, the product placement system 102 may place different product information into a same sequence of frames that contain existing object. This may achieve more effective personalized marketing, advertising and product placement. As shown, the user viewing screen 104(A) sees an actor in a living room scene wearing a new shirt from "Clothes Co. ABC" while the user viewing screen 104(B) sees the same actor wearing a new shirt from "Clothes Co. XYZ." Similarly, the user viewing screen 104(A) sees a "Mexican Food Cook Book" in the living room scene, while the user viewing screen 104(B) sees an "Italian Food Cook Book." In this example scene, the product placement system 102 identifies the actor's shirt and the cook book as existing objects that are associated with a product placement opportunity within the video content.

Illustrative Device

Figure 2:
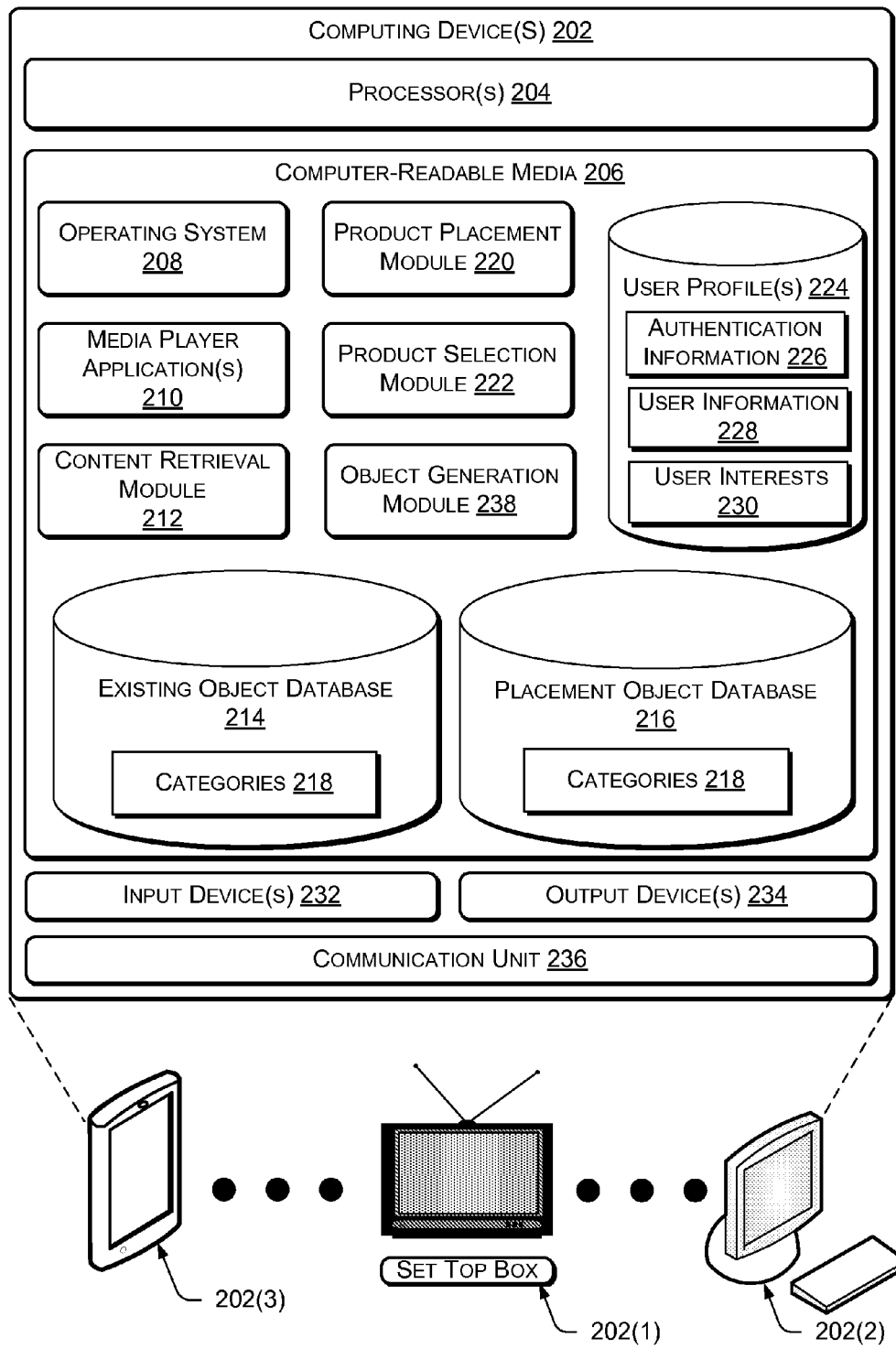
FIG. 2 shows a functional diagram of selected components implemented at a computing device.

FIG. 2 shows example functional components of the product placement system 102 illustrated in FIG. 1. The product placement system 102 may include one or more computing devices 202 that support rendering, mixing and displaying digital content for viewing. Thus, the product placement system 102 may comprise a single computing device 202 (as referred to herein) or multiple computing devices 202 that may communicate and/or work together to provide such functionality. Therefore, the computing device 202 may be a set top box 202(1) or other customer-premises equipment coupled to, or included as part of, a television system. The computing device 202 may also be implemented as a personal computer 202(2), a portable media player device 202(3), or any other computing device capable of downloading, storing, rendering, mixing, and/or displaying digital content, such as television systems, tablets, desktop computers, laptop computers, netbooks, notebooks, smartphones, personal media players, personal digital assistants (PDAs), digital video recorders (DVRs), gaming consoles, video streaming devices, digital versatile disks ("DVD") players, Blu-ray players, augmented reality systems, telepresence or telerobotics systems, etc. The illustrated devices 202(1), 202(2), and 202(3) are merely provided as examples and not intended to be limiting, as the techniques described in this document may be implemented by any computing device capable of downloading, storing, rendering, mixing and/or displaying digital content.

In the illustrated implementation, the computing device 202 includes one or more processors 204 and computer-readable media 206. In various embodiments, the processors 204 include a graphics processing unit (GPU) capable of generating and/or rendering graphic images for display and/or digitally mixing and/or transforming existing objects (e.g., place product information on or over existing objects).

The computer-readable media 206 may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), electrically erasable programmable read-only memory ("EEPROM"), flash memory or other memory technology, CD-ROM, DVD or other optical storage, magnetic cassettes, magnetic tape, magnetic disk storage or other magnetic storage devices, redundant array of independent disks ("RAID") storage systems, or any other medium which can be used to store the desired information and which can be accessed by a computing device. The computer-readable media 206 may be implemented as computer-readable storage media ("CRSM"), which may be any available physical media accessible by the processor(s) 204 to execute instructions stored on the memory. In one basic implementation, CRSM may include RAM and Flash memory. In other implementations, CRSM may include, but is not limited to, ROM, EEPROM, or any other tangible medium which can be used to store the desired information and which can be accessed by the processor(s) 204.

Several modules, databases, and so forth may be stored within the computer-readable media 206 and configured to execute on, or by, the processor(s) 204. A few example functional modules are stored in the computer-readable media 206 and executed on the processor(s) 204, although the same functionality may alternatively be implemented in hardware, firmware, or as a system on a chip (SOC).

An operating system module 208 may be configured to manage hardware and services within and coupled to the computing device 202 for the benefit of other modules. As further discussed herein, one or more media player application(s) 210 or tuners may be configured to render digital content, receive a digital content signal, and/or cause the display of digital content.

In various embodiments, a content retrieval module 212, in accordance with the media player application 210, may locate and receive digital content to be viewed on the computing device 202, or on a display coupled to the computing device 202 (e.g., a set top box and a television screen). In alternative embodiments, a tuner may receive a digital signal as part of a subscription plan (e.g., tuning into a television broadcast). As part of the digital content or as a supplement to the digital content, the content retrieval module 212 may also receive existing objects for the digital content and store the existing objects and the metadata in an existing object database 214.

In some embodiments, the existing object database 214 and the metadata may contain a time-varying alpha-channel mask or contours indicating portions of existing objects that are visible and not occluded by other objects as the objects move through the scene. An existing object may also contain broader information that describes multiple scene-related objects that may not appear as individual physical entities in the scene. For example, an existing object may represent an entire scene defined by attributes such as a start time and duration relative to the digital content, a scene context, time of day, characters in the scene and so forth. An existing object may also contain computer-graphics modeling information related to the scene such as information describing light sources that illuminate the objects.

The content retrieval module 212 may also receive placement objects (e.g., placement product information) and store the placement objects in a placement object database 216, as further discussed herein. In various embodiments, the placement objects may be specifically received in association with particular digital content (e.g., a particular movie or television program), or the placement objects may be a broader library of objects that may be configured for use with a wide range of different digital content. Thus, the content retrieval module 212 may organize both the existing object database 214 and the placement object database 216 in accordance with multiple different categories 218, as discussed above. The categories 218 may define a type or class for an object. For example, a category 218 may define different cook book objects that may be inserted in a kitchen setting or living room setting, different toy objects or deck furniture objects that may be inserted in a yard setting, different coffee retailer name objects or musical clip objects that may be inserted in a coffee shop setting, different recreational equipment objects or apparel company name objects that may be inserted in a sports setting, etc.

In various embodiments, the product placement module 220 may be configured to identify product placement opportunities in the digital content prior to a viewing or during a viewing. That is, the product placement module 220 may determine that an existing object in the digital content provides an opportunity to place product information stored in the placement object database 216. Then the product placement module 220 can issue an instruction or indication to the product selection module 222 to select product information from the placement object database 216.

In various embodiments, the product selection module 222 may access profile information indicative of personal interests and preferences of an identified user, as well as the metadata for the existing object in the existing object database 214, and the product selection module 222 may select product information from the placement object database 216 based on the personal interests and preference of the identified user. In other embodiments, the product selection module 222 may select product information based on existing object characteristics and/or other viewer characteristics not associated with actual user identification. The selected product information has to be an appropriate candidate object to place on or over the existing object so that the graphical elements seamlessly align (e.g., shape, size, lighting, texture, orientation, etc.).

In various embodiments, the product placement module 220 receives information associated with the selected product information and digitally renders and/or transforms the product information so that it is inserted into one or more frames of the digital content at a location where the existing object occurs. Thus, once inserted, the product information will have a realistic appearance and look as though it was physically present in the scene of the digital content when the digital content was filmed or produced, even though the product selection module 222 and the product placement module 220 selected and inserted the product information after the digital content was filmed or produced (e.g., at a time the digital content is being rendered or viewed at a client device).

In various embodiments, the computer-readable media 206 may include one or more user profiles 224. The user profiles 224 may include authentication information 226 associated with a user registration on the computing device 202 and/or user verification (e.g., user identification (ID), password, user token, etc.). Thus, when providing customized and targeted product placement in digital content, the computing device 202 may know which user is viewing the digital content. In various embodiments, the authentication may be associated with a group of users (e.g., parents, children), and the customized and targeted product placement may be directed to multiple users (e.g., a mixed selection of placement objects targeting multiple users).

In various embodiments, the user profiles 224 may include user information 228. The use information 228 may include demographic information for an individual user (e.g., age, gender, ethnicity, language, employment, income, etc.), payment information for online shopping, purchase permissions and restrictions, digital content viewing restrictions and permissions (e.g., type of content, time of content viewing, amount of content viewing allowed, etc.).

In various embodiments, the user profiles 224 include user interests 230 (e.g., personal interests and preferences). In some instances, the user interests 230 may be derived or implied by the computing device 202 or other devices based on monitored user activity. For example, the computing device 202 may track the user's online shopping history, online purchase history, and electronic marketplace or web-store browsing history on the devices 202 or other devices configured for a user account to determine user interests 230. Thus, the authentication information 226 may be associated with, or mapped to, an account shopping token that identifies the user while the user shops online or after the user purchases an e-commerce product or service. In other instances, the user interests 230 may be explicitly defined by a user when the user first registers an account/profile with the computing devices 202 or when the user logs-in and updates his or her interests as they change over time.

In various embodiments, the user interests 230 may include time-based interest information. For example, when the product selection module 222 is tasked with selecting a different type of cook book placement object in a kitchen or living room setting, the user interests 230 may indicate the most recent user preference relating to food consumption habits (e.g., the user bought a pasta machine online last week compared to a waffle maker purchase that occurred over a year ago). The product selection module 222 may then determine that an Italian Food Cook Book, rather than a Breakfast Cook Book, is more likely to appeal to the user, and result in an online cook book purchase.

Therefore, based on the user profiles 224, the computing device 202 may know which user is requesting that a media player application 210 or tuner access digital content (e.g., a movie, a recorded television program, a VOD program, a real-time broadcast television program, etc.). In various embodiments, the content retrieval module 212 may then retrieve or stream the digital content from a content server. In other embodiments, the digital content may have been previously accessed or downloaded, and therefore may be stored locally at computing device 202.

The computing device 202 may also include input devices 232 and output devices 234. The input devices 232 may include an infrared (IR) television controlling device, a keyboard, a keypad, a mouse, touch screen input, a joystick, control buttons, scrolling input, microphones, a camera or other image capture device, etc. The output devices 234 may also include a display (e.g., touch screen, liquid crystal display (LCD), plasma display (PDP), digital light processing (DLP), cathode ray tubes (CRT), organic light-emitting diode (OLED), surface-conduction electron-emitter display (SED), field emission display (FED), etc.), speakers, or the like.

The computing device 202 may also include a communication unit 236 to facilitate a wired and/or wireless connection to a network, content providers, service providers and/or other devices. Therefore, the communication unit 236 may implement one or more of various wired and/or wireless technologies, such as a content delivery network (CDN), Internet protocol television (IPTV), direct-broadcast satellite communications, Wi-Fi communications, Bluetooth communications, radio frequency (RF), USB communications, RCA connections, a broadband connection, optical port, Ethernet, or any other acceptable communications or connections protocol.

In various embodiments, the computer-readable media 206 includes an object generation module 238. The object generation module 238 may be configured to access or generate existing objects in various ways. For example, with computer generated digital content, the object generation module 238 may import already defined existing objects and their metadata descriptions from computer graphics modeling software used to create the scenes. In another example, with digital content that was filmed or videotaped, the object generation module 238 may implement computer vision algorithms to analyze the digital video content, detect and outline objects in different scenes, categorize the objects, and generate metadata descriptions for different existing objects. Moreover, the object generation module 238 may also leverage human assistance to detect and outline the objects in different scenes and to generate accurate object descriptions.

Accordingly, the generation of existing objects may be performed after digital content has already been filmed and produced (e.g., using automated computer vision and image analysis tools), or existing objects may be generated in accordance with a filming and production process that is conducive to subsequent object placement by creating an existing object database as the digital content is filmed or produced. In some embodiments, digital content may be filmed and/or produced with "green screen" objects, and then the product information may be dynamically placed or embedded in the digital content where the green screen objects occur.

Illustrative Architecture

Figure 3:
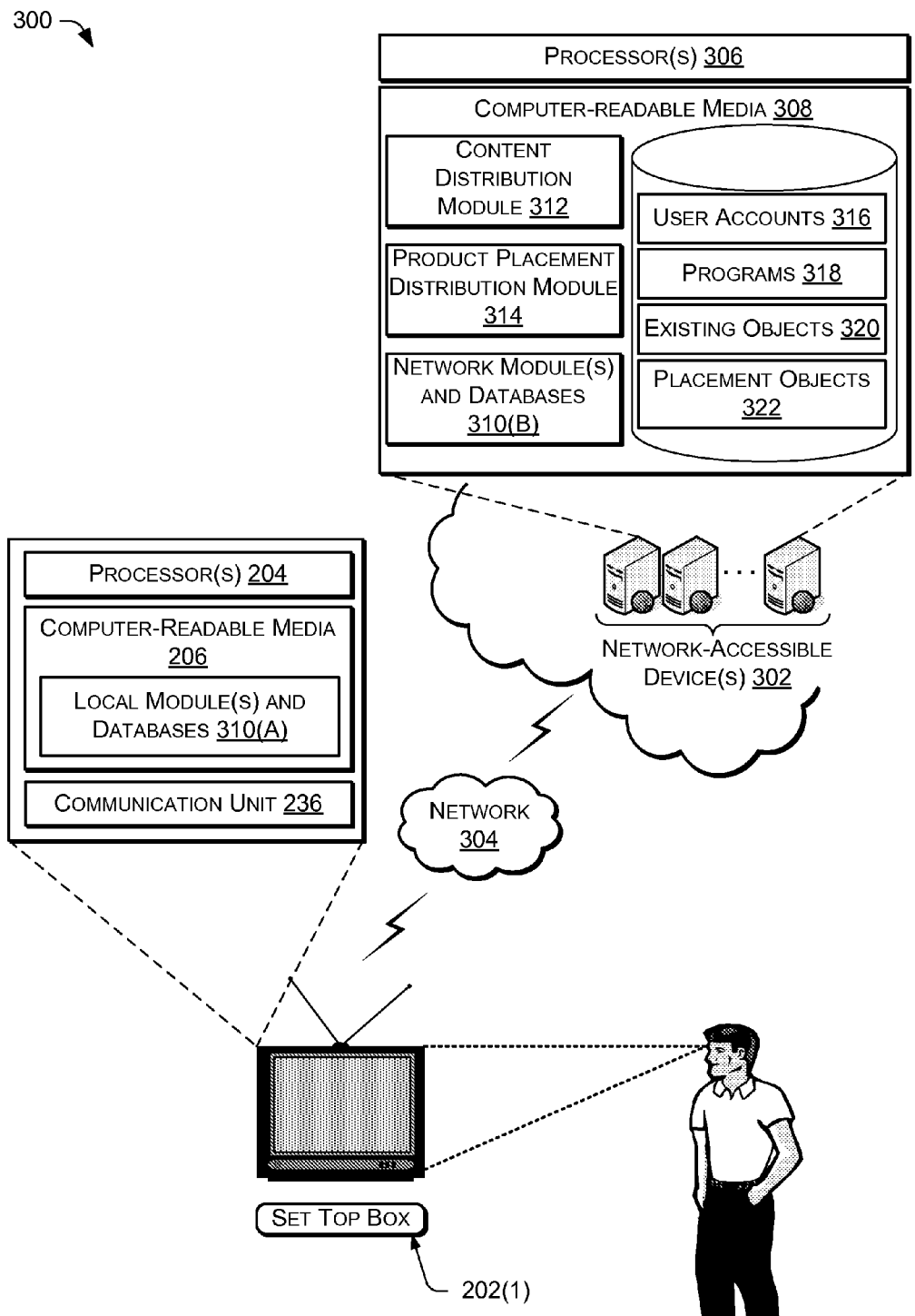
FIG. 3 shows a functional diagram of selected components implemented at a computing device and services accessible via a network.

FIG. 3 is a system architecture 300 showing an implementation where the computing device 202 communicates, via the communication unit 236, with another entity, such as network-accessible devices 302 that may be part of cloud services (e.g., service providers and/or content providers). Cloud services generally refer to a network accessible platform implemented as a computing infrastructure of processors, storage, software, data access, and so forth that is maintained and accessible via one or more networks 304 such as the Internet. Cloud services may not require end-user knowledge of the physical location and configuration of the system that delivers the services. Common expressions associated with cloud services include "on-demand computing", "software as a service (SaaS)", "platform computing", "network accessible platform", and so forth.

The network-accessible devices 302 may be servers, and therefore, may include one or more processors 306 and computer-readable media 308. The processor(s) 306 and the computer-readable media 308 of the network-accessible devices 302 are physically separate from the processor(s) 204 and computer-readable media 206 of the computing device(s) 202, but may function jointly as part of a system that provides processing and memory in part on the computing device(S) 202 and in part on the cloud services, for example. These network-accessible devices 302 may be arranged in any number of ways, such as server farms, stacks, and the like that are commonly used in data centers.

The modules, applications and databases illustrated on the computing device 202 in FIG. 2, are collectively referred to as local module(s) and information 310(A) in FIG. 3. Thus, FIG. 3 illustrates an implementation where some of the functional modules, applications and databases of the computing device 202 may optionally be provided by the cloud services, as illustrated by corresponding network module(s) and information 310(B) on the network-accessible devices 302. In this implementation, the computing device 202 and the network-accessible devices 302 may work together to perform the functionality described above. For example, in one embodiment, the product information selection and placement may be performed in the cloud prior to distribution of the digital content, rather than on the computing device 202. Thus, the specific location of the respective modules used to implement the product placement discussed herein is not limiting and the description below is equally applicable to any implementation that includes local device(s), a cloud-based service, or combinations thereof.

In some embodiments, the network-accessible devices 302 may be part of an account-based entity that provides services and/or content to subscribers (e.g., the user viewing the television in FIG. 3). Thus, the computer-readable media 308 of the network-accessible devices 302 may include a content distribution module 312 and/or a product placement distribution module 314. The computer-readable media 308 of the network-accessible devices 302 may also include information associated with user accounts 316, different digital content programs 318 (e.g., movies, television programs, Internet videos, etc.), existing objects 320 associated with the programs 318, and/or placement objects 322.

The information associated with the user accounts 316 may include information similar to that stored in the user profiles 224, as well as additional account or subscriber information. Moreover, network-accessible devices 302 may collect or access the programs 318, existing objects 320 and/or placement objects 322 from other third party entities (e.g., television broadcast companies, advertisers, online merchants, etc.). Alternatively, the account-based entity may generate the programs 318, existing objects 320 and/or placement objects 322.

As illustrated in FIG. 3, a set top box 202(1) may identify a viewer (e.g., facial recognition algorithms, user ID and password, voice recognition, etc.), and the viewer may tune into a channel accessible by a set top box 202(1) so that he/she can watch a program on the television. Or, the viewer may request that the set top box access a particular movie or "on demand" digital content (e.g., via the network or locally).

In response to the tuning or request, the content retrieval module 212 on the computing device 202 may request the digital content and the content distribution model 312 is configured to identify the digital content in the programs 318 database, and distribute the requested digital content to the computing device 202. In some instances, the content distribution module 312 distributes existing objects 320 with the digital content. Additionally, the product placement distribution module 314 may distribute product placement information to the computing device 202. In some instances, various placement objects 322 may be pre-associated with particular existing objects in the digital content (e.g., different types of cook books that can be inserted for a cook book in a scene, different types of soda for a soda can in a scene). Thus, the product placement distribution module 314 may distribute the pre-associated placement objects with the digital content so that the product selection module 222 may select the placement object that the viewer is most likely interested in, as discussed above. In other instances, the product placement distribution module 314 may distribute a broad library of placement objects 322 organized by the categories 218. These placement objects may be inserted into various different movies and television programs.

The operations of the product placement system 102 in FIG. 1, the one or more device(s) 202 in FIG. 2 that comprise the product placement system 102, and/or the system architecture 300 in FIG. 3 are described in additional detail with regard to FIGS. 4-6 below.

Illustrative Processes

Figure 4:
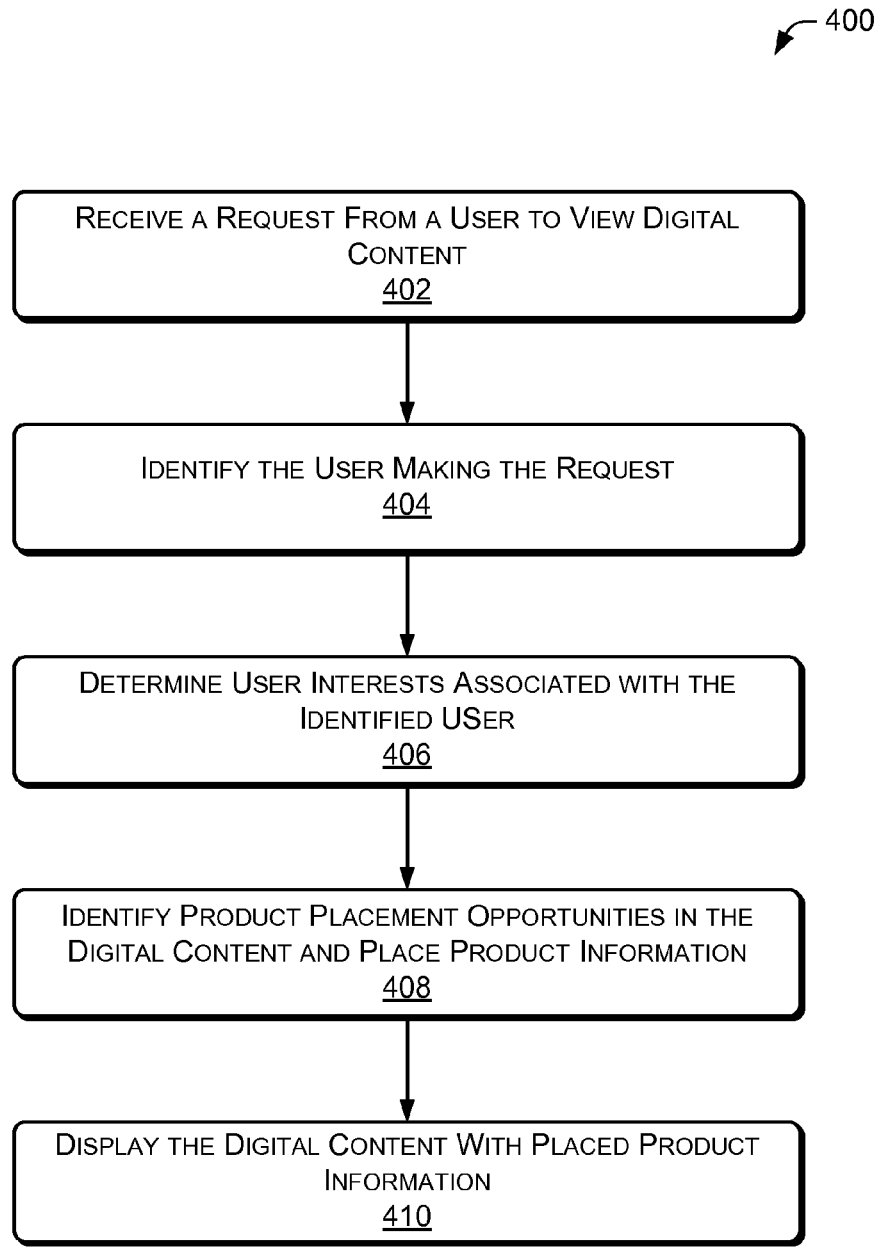
FIG. 4 shows an example process that places product information into digital content being viewed by a user.
Figure 5:
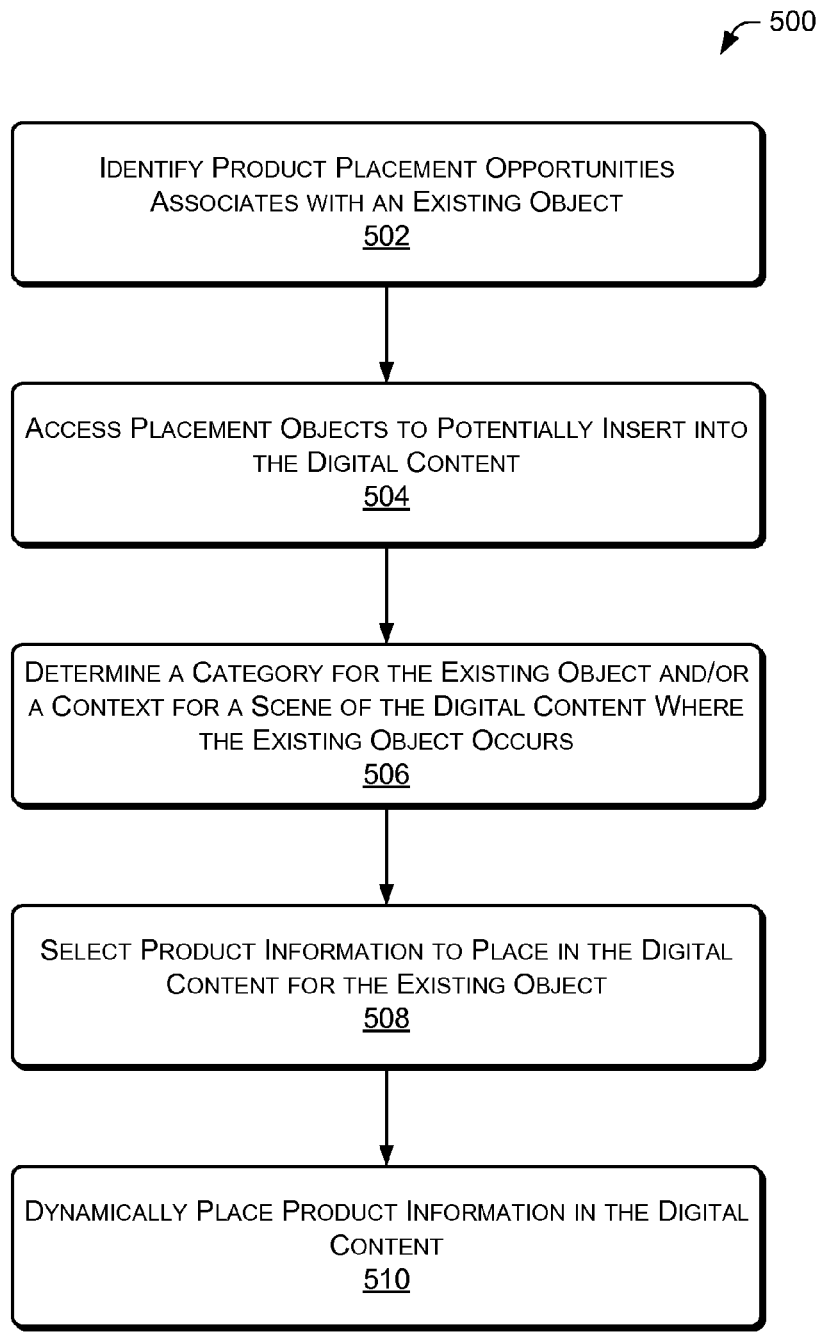
FIG. 5 shows another example process that places product information into digital content being viewed by a user.
Figure 6:
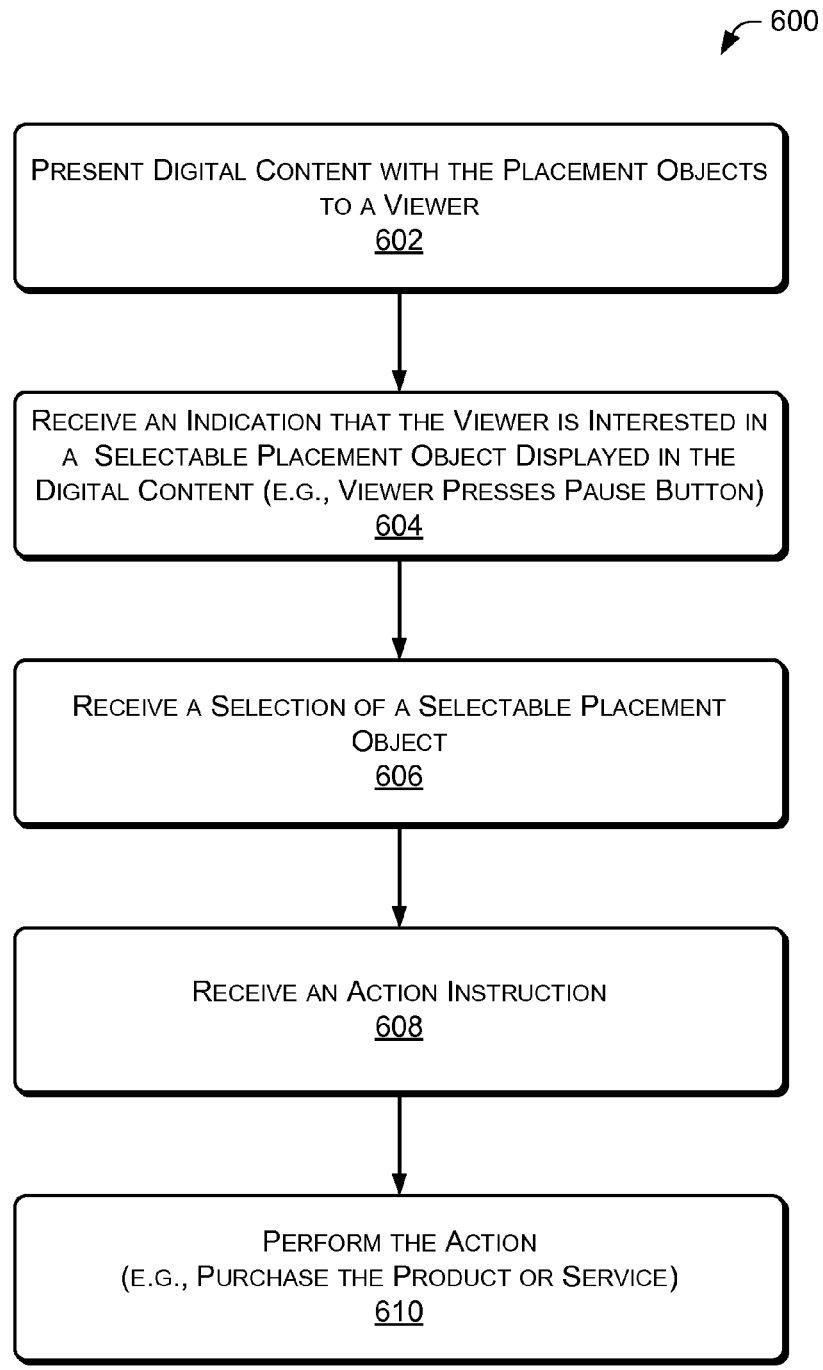
FIG. 6 shows an example process that allows a user to select a product or service represented by product information that has been placed into digital content.

The processes illustrated in FIGS. 4-6 and described herein are a collection of blocks or actions in logical flow graphs. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 4 shows an example process 400 associated with a user viewing digital content. The process 400 may be implemented by the product placement system 102 (e.g., computing device(s) 202) and/or the network-accessible devices 302, or by other devices.

At 402, the product placement system 102 may receive a request, via a media player application 210 or tuner, from a user to view digital content (e.g., stream or play video content). In a first example, the request may be an indication to tune to particular television channel or television signal broadcasting a particular program. In a second example, the request may be to watch a movie or on demand program downloadable over network 304, or stored locally. In a third example, the request may be to view an Internet video, accessible via network 304 at a URL. In yet another example, the request may be to download and view a document (e.g., an electronic book, news article) and an existing object may be a portion of text, a still image or a portion of a still image that may be replaced by a placement object. In even a further example, the request may be an augmented reality data request where a user can virtually view digital content of a current location.

At 404, the product placement system 102 recognized or identifies the user or group of users making the request. For example, the user may log-in to the computing device 202 and the computing device 202 may verify the user by using the authentication information 226 or other identification information. In another example, the product placement system 102 may employ a camera or other image capture device or sensor(s) to perform facial recognition to identify the user or group of users. In another example, the product placement system 102 may employ voice recognition techniques to identify the user.

At 406, the product placement system 102 may access profile data to determine information indicative of user interests 230 (e.g., personal interests and preferences) for the identified user requesting to view digital content. In various embodiments, the user interests 230 are stored in user profiles 224 (e.g., on computing device 202 or network-accessible devices 302), and are dynamically tracked and updated, over time, based on a user account activity, such as an online purchase history, online shopping history, online browsing history, etc. In some embodiments, the user interests 230 may be explicitly provided by the user when he/she registers with the computing device 202 and/or as the user interests 230 change over time (e.g., as the user gets older and interests change).

At 408, the product placement system 102 identifies one or more product placement opportunities within the digital content and places product information in the digital content based on the determined user interests 230. For example, the product placement system 102 identifies the product placement opportunities by determining a location (e.g., one or more frames), within the digital content, where an existing object occurs. The product placement opportunities may be identified by accessing an existing object database 214 for the digital content, or by locating metadata for the digital content describing the product placement opportunities. As discussed above, the product placement opportunities provide the content providers and/or service providers with a more effective advertising approach because tailored product information that is matched with the user interests 230 can be placed on or over an existing object, and therefore, the tailored product information is more likely to appeal to the user (e.g., result in an online purchase or future purchase of the product, result in an online inquiry about the inserted product, etc.).

In various embodiments, the computing device 202 may receive the digital content, the existing objects, and the placement objects, and the product placement may be performed on the computing device 202 after or during the downloading (e.g., streaming) of the digital content, yet before the portion of the digital content associated with the product placement is displayed. In some embodiments, the product placement is performed at the network-accessible devices 302 before the digital content is downloaded or distributed to the computing device 202.

At 410, the product placement system 102 retrieves and/or displays the digital content, with the placed product information, to the user. Again, since the placed product information may advertise or market products and services within, or integrated into, the digital content that the user wants to watch, they are not perceived as an annoyance, distraction or a waste of time. Moreover, the customized and targeted product placement based on user interests 230 is more effective because different viewers of the same scene in the same digital content can be exposed to (e.g., see or hear) different brand names (e.g., company names, logos, trademarks, etc.) and be exposed to different products or services.

FIG. 5 shows an example process 500 in which product information is placed into the digital content. The process 500 may be implemented by the components at the computing device 202 and/or the network-accessible devices 302, or by other devices.

At 502, the product placement module 220 analyzes the digital content and identifies product placement opportunities associated with an existing object (e.g., locate frames that contain the existing object). In various embodiments, the product placement module 220 may identify an opportunity for product placement by accessing metadata for existing objects, as stored in the existing object database 214. For example, the object retrieval module 212 may access or import existing objects that are generated or created in conjunction with the filming or production of the digital content, and store the existing objects in the existing object database 214 on the computing device or store the existing objects 320 on the network-accessible devices 302.

In an alternative embodiment, the object generation module 238 may generate the existing objects using computer vision algorithms that analyze the digital content, detect and outline objects in different scenes that provide an opportunity for product placement, and generate metadata descriptions for different existing objects. Accordingly, the generation of existing objects for digital content may be performed before or after the user requests to view the digital content.

At 504, the product placement module 220 may access product information to potentially place into the digital content. For example, the product placement module 220 may access placement objects 322 and populate the placement object database 216 with the placement objects that may potentially be inserted into the digital content. In various embodiments, the network-accessible devices 302 that are part of an account-based entity may receive the placement objects 322 from third party entities (e.g., companies, advertising agencies, marketing agencies, etc.) or third party electronic marketplaces that want to advertise or market a brand name, a product or service within digital content. In alternative embodiments, the placement objects 322 may be generated by the account-based entity. For example, the account-based entity may generate individual placement objects for different products or services currently available for sale in a proprietary or partner electronic marketplace or other Internet shopping platform provided by the account-based entity.

At 506, the product placement module 220 determines a category for the existing object and/or a context for the scene in the digital content where the existing object occurs. For example, the context may be associated with a kitchen setting and the category may be a cook book. In another example, the context may be a sports game setting and the category may be a football team name. The product placement module 220 may then match the category and/or the context of the existing object with a category for placement product information, so that appropriate placement product information can be selected for one or more existing objects that occur within the scene context.

At 508, the product selection module 222 may select the product information to place into the digital content at one or more locations where the existing object occurs (e.g., appears). In various embodiments, the selection may be based on the user interests 230, and the selection may be made from a placement object category 218 that matches the existing object category (e.g., a cookbook that corresponds to a user interest). In some embodiments, the product selection module 222 may consider products or services that are currently available for sale in an electronic marketplace, and whether or not the products or services are currently popular selling items. In another example, the product selection module 222 may consider a value amount an advertiser is willing to pay to have their product information placed or inserted into the digital content at a time of rendering for an individual user. That is, different advertisers may provide a bid price to have their product information placed, and the product selection module 222 may select product information for placement based on a highest bid, for example.

Moreover, in various embodiments, the product selection module 222 may consider different levels of user interest or likelihood of the user to purchase a product while viewing the digital content. For example, the product selection module 222 may correlate a user with a high level of personal interest in a product and strong likelihood to make an "in viewing" purchase with an advertiser willing to pay a high amount (e.g., threshold amount) to have their product placed in the digital content. In contrast, the product selection module 222 may correlate a user with a minimal level of personal interest in a product and small likelihood to make an "in viewing" purchase with an advertiser willing to pay a smaller amount to have their product placed in the digital content.

In other embodiments, the product selection module 222 may select product information to place without considering user interests. For example, the product selection module 222 may determine that a cookbook cover object can be placed, and then the product selection module 222 may select a cookbook cover object based on a value amount an advertiser is willing to pay. In some instances, the product selection module 222 may detect or access viewer characteristics that are not associated with an individual identity or unique user information. For example, the product selection module 222 may select product information based on a detected gender or probable age of a viewer, without identifying the viewer. In another example, the product selection module 222 may determine that a viewer is a child and not an adult.

At 510, the product placement module 220 receives the product information selected by the product selection module 22 and dynamically places the product information in the digital content. In various embodiments, the product placement includes replacing the existing object with the selected product information (e.g., completely replacing soda can A with soda can B). This may include ensuring that the placement object characteristics and graphical elements align with the existing object characteristics and graphical elements (e.g., a size, a shape, lighting, texture and orientation). In some embodiments, the product placement includes mapping select graphical elements of a placement object to corresponding elements of an existing object in accordance with the metadata description (e.g., replacing a clothing apparel company brand name on the front of a shirt without changing the color). Thus, using the existing object metadata description, the product information may be placed so that it appears as if it were physically present in the scene of the digital content at the time of filming or production.

In some embodiments, the product placement system 102 may replace different instances (e.g., more than one) of the same or similar existing objects that appear in different scenes of the digital content (e.g., different sequences of frames). For example, the product placement system 102 may replace different instances of Soda Can A with Soda Can B.

FIG. 6 shows an example process 600 in which a viewer of the digital content with integrated placement objects may select a product or service for purchase or may request additional information about the product or service. The process 600 may be implemented by the product placement system 102 (e.g., the computing device(s) 202) and/or the network-accessible devices 302, or by other devices.

At 602, the product placement system 102 may be presenting the digital content with the selectable placement objects to the user. Thus, the user may be viewing the digital content on a display, as illustrated in FIG. 1. In various embodiments, the product placement system 102 may graphically highlight or outline the selectable placement objects in the digital content, so that the user is aware of which products or services may be selectable placement objects.

At 604, the product placement system 102 may receive an indication from the user that the user is interested in a currently displayed selectable placement object that defines or represents a product or service. For example, the user may press a button or other form of input to pause the digital content at a particular point or at a video frame as it is being played back. In alternative embodiments, the user may remember a product or service integrated in the digital content, and may indicate that he or she wants to view the selectable placement object in the digital content after completing the viewing of the digital content.

At 606, the product placement system 210 may receive a selection of one of the currently displayed selectable placement objects or one of the previously displayed selectable placement objects. For example, the user may click on a displayed selectable placement object or navigate a focus element (e.g., a cursor) to the displayed selectable placement object that he or she is interested in.

At 608, the product placement system 102 may receive an action instruction. In various embodiments, the product placement system 102 may present options for the user to choose, such as "purchase the item," "add item to a wish list," and/or "view additional information about the item" (e.g., cost, manufacturer, dimensions, price, etc.). Thus, the received action may be a user-selected one of the options.

At 610, the product placement system 102 performs the action. For example, the product placement system 102 may place an order for the selected product or service and debit or charge an account of the user for the retail price. In other examples, the product placement system 102 may add the product or service to a wish list maintained by an account of the user, or display the additional information requested.

The techniques, systems and example processes discussed above may be implemented for different viewers and different digital content such that targeted product and service marketing and advertising can be achieved after the digital content is filmed or produced (i.e., the displayed product or service does not have to be physically present in the scene at a time when the scene is filmed or produced).

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A method comprising:
    receiving, at a network-accessible device, a request to stream a video, the request being based on a selection of a user;
    identifying one or more frames of the video that include an existing object to receive product information directed to the user that selected the video;
    accessing profile data associated with the user, the profile data being based at least in part on previous transactions between the user and an electronic marketplace;
    selecting the product information to place on or over the existing object based at least in part on the profile data, wherein the product information is associated with one or more items that the electronic marketplace offers for acquisition;
    determining a location of the existing object within individual frames of the one or more frames;
    dynamically placing the product information on or over the existing object at the location within the individual frames; and
    causing the video with the product information to be displayed.

2. The method as recited in claim 1, wherein the product information is one or more of a company name, a company logo, or a product name.

3. The method as recited in claim 1, wherein the existing object is associated with metadata that describes the existing object, wherein the metadata includes at least one of a product category of the existing object, a context of a scene in the video in which an individual frame is located, a size of the existing object, or a shape of the existing object.

4. The method as recited in claim 1, further comprising:
    configuring the product information as a placement object to be selectable via a user interface when the video is displayed;
    receiving a selection of the placement object during the displaying of the video; and
    providing marketing information related to a sale of a product or a service represented by the placement object after the selection of the placement object.

5. One or more non-transitory computer-readable media having computer-executable instructions that, when executed by one or more processors, cause the one or more processors to perform operations comprising:
    identifying an existing object included in a digital image, the existing object to receive product information selected for a user profile;
    accessing profile data that indicates at least one previous item acquired in association with the user profile via an electronic marketplace that provides information used to maintain the user profile;
    selecting, based at least in part on the at least one previous item acquired in association with the user profile, the product information to be placed in association with the existing object, wherein the product information is associated with an item or a service the electronic marketplace offers for acquisition; and
    causing the digital image to be rendered with the product information.

6. The one or more non-transitory computer-readable media as recited in claim 5, wherein the operations further comprise causing the digital image with the product information to be displayed.

7. The one or more non-transitory computer-readable media as recited in claim 5, wherein the operations further comprise causing the product information to be rendered as at least part of a placement object that is selectable to obtain information on the item or the service offered for acquisition by the electronic marketplace.

8. The one or more non-transitory computer-readable media as recited in claim 7, wherein the operations further comprise:
    receiving an instruction that selects the placement object while the digital image is being displayed; and
    placing an acquisition order with the electronic marketplace for the item or the service.

9. The one or more non-transitory computer-readable media as recited in claim 5, wherein the operations further comprise:
    accessing metadata describing the existing object to determine a product placement category; and
    selecting the product information based at least in part on the product placement category.

10. The one or more non-transitory computer-readable media as recited in claim 5, wherein the operations further comprise identifying the user profile via a user log-in technique, a facial recognition technique, or a voice recognition technique.

11. The one or more non-transitory computer-readable media as recited in claim 5, wherein prior to the causing of the digital image to be rendered, configuring the existing object as a green screen object that does not market a product, a service, a company, or a brand.

12. The one or more non-transitory computer-readable media as recited in claim 5, wherein the digital image is one of at least one video frame of a movie, at least one video frame of a television program, at least one video frame of an on demand program, at least one video frame of an Internet video accessible by a uniform resource locator (URL), at least one video frame of a game, a static image, a photograph, part of telepresence data, or part of augmented reality data.

13. The one or more non-transitory computer-readable media as recited in claim 5, wherein the product information includes at least part of an audio recording.

14. The one or more non-transitory computer-readable media as recited in claim 5, wherein the causing of the digital image to be rendered comprises replacing the existing object with the product information based on metadata that describes a shape and a size of the existing object.

15. The one or more non-transitory computer-readable media as recited in claim 5, wherein the causing of the digital image to be rendered comprises mapping the product information to at least a portion of the existing object based on metadata that describes a graphical position for the product information.

16. The one or more non-transitory computer-readable media as recited in claim 5, wherein the operations are performed by a distributed computing service.

17. The one or more non-transitory computer-readable media as recited in claim 5, wherein the operations are performed by one or more computing devices configured to present the digital image to the user.

18. A method comprising:

receiving a request to play a video;

identifying one or more frames in the video that contain an existing object associated with an opportunity to place product information;

accessing profile data associated with a user that initiates the request to play the video, the profile data indicating monitored activity associated with a user profile;

accessing a plurality of placement objects that are associated with different product information, the plurality of placement objects being respectively associated with a plurality of items offered for acquisition by an electronic marketplace that provides information used to maintain the user profile;

selecting, based on the profile data, a placement object from the plurality of placement objects; and inserting the placement object in the one or more frames prior to the video being played or while the video is played.

19. The method as recited in claim 18, wherein the placement object comprises a brand name that promotes a product or a service of an entity that pays to have the placement object placed in the video after the request to play the video.

20. The method as recited in claim 18, wherein the placement object comprises an audio element that audibly promotes a product, a service, or an audio work of an entity that pays to have the placement object placed in the video after the request to play the video.

21. The method as recited in claim 18, wherein the monitored activity includes one or more of a purchase history associated with the user profile or an online browsing history associated with the user profile.

22. The method as recited in claim 18, wherein the video is one of a movie, a television program, an on demand program, an Internet video accessible by a uniform resource locator (URL), a game, telepresence data, or augmented reality data.

23. A system comprising:

one or more processors;

one or more computer-readable storage media storing computer-executable instructions;

an object retrieval module maintained in the one or more computer-readable storage media and executed by the one or more processors to access video content associated with a viewing request; and an object placement module maintained in the one or more computer-readable storage media and executed by the one or more processors to determine one or more frames in the video content that contain an existing object associated with an object placement opportunity; and an object selection module maintained in the one or more computer-readable storage media and executed by the one or more processors to access a user profile associated with the viewing request to determine user interests based at least in part on monitored activity and to select, based at least in part on the user interests, a placement object to dynamically modify individual frames of the one or more frames that contain the existing object, wherein the placement object is associated with a product or a service offered for acquisition by an electronic marketplace that provides information to maintain the user profile.

24. The system as recited in claim 23, wherein the system includes a set top box, and one or more of the object retrieval module, the object placement module, and the object selection module are executed via the set top box.

25. The system as recited in claim 23, wherein the system includes one or more network-accessible devices that distributes the video content, and one or more of the object retrieval module, the object placement module, or the object selection module are executed via the one or more network-accessible devices.

* * * * *